US006823126B2

(12) United States Patent
Wang

(10) Patent No.: US 6,823,126 B2
(45) Date of Patent: Nov. 23, 2004

(54) CONNECTOR DETACHER FOR DETACHING A CONNECTOR FROM A CONNECTING PART BY USING A SLIDING BLOCK TO PUSH AGAINST THE CONNECTING PART

(75) Inventor: Keng-Meng Wang, Singapore (SG)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/406,712

(22) Filed: Apr. 2, 2003

(65) Prior Publication Data

US 2003/0235386 A1 Dec. 25, 2003

(30) Foreign Application Priority Data

Jun. 21, 2002 (SG) ..................................... 200203769-5

(51) Int. Cl.[7] .......................... G02B 6/00; H01R 13/62
(52) U.S. Cl. ...................................... 385/134; 439/352
(58) Field of Search ........................ 385/134; 439/352, 439/157, 160

(56) References Cited

U.S. PATENT DOCUMENTS

| 4,232,926 | A | * | 11/1980 | Inouye et al. ............... 439/157 |
| 5,574,814 | A | | 11/1996 | Noddings et al. |
| 6,056,567 | A | * | 5/2000 | Schell ......................... 439/160 |
| 6,480,005 | B2 | * | 11/2002 | Nagano et al. ............. 324/538 |
| 6,666,704 | B2 | * | 12/2003 | Rodney, Sr. ................ 439/352 |

* cited by examiner

Primary Examiner—Chandrika Prasad

(57) ABSTRACT

A connector detacher for removing a connector, which is connected at a connecting portion to a connecting part of an electrical or an optoelectronic device, from said connecting part, whereby the connector detacher comprises a base body which has a recess for receiving the connector, the recess providing a connection passage open to the outside in a direction towards the connecting portion of the connector received within the recess, thereby allowing the connector to be connected at the connecting portion to the connecting part through the connection passage. Furthermore, the connector detacher has holding means for holding the connector within the recess and mechanical linkages arranged on the base body, said mechanical linkages having a sliding block pushing portion which is moveable relative to the base body in direction towards the connection passage and which is provided for pushing against the connecting part in order to strip the connector therefrom.

11 Claims, 1 Drawing Sheet

CONNECTOR DETACHER FOR DETACHING A CONNECTOR FROM A CONNECTING PART BY USING A SLIDING BLOCK TO PUSH AGAINST THE CONNECTING PART

FIELD OF THE INVENTION

The present invention in the field of electronic technology is related to a stripper for removing a connector, which is connected to a connecting part of an electrical or an optoelectronic device.

BACKGROUND OF THE INVENTION

In general, electrical or optoelectronic devices consist of several assembled modules, which input and output electrical and/or optical signals during operation. A signal transfer of electrical signals is performed by cables, and a transfer of optical signals by optical fibers, wherein the cables and the optical fibers are connected to interface ports of the modules by means of connectors. The modules comprise connecting parts which mate with the relevant connectors. Since the signal transfer between electrical or optoelectronic devices can reach a high complexity, it can be necessary to provide numerous interface ports with connector mating parts. In this case, a procedure for connecting the connectors to the connector mating parts can be complicated by the fact that space is limited and the connectors have small dimensions. For example, a typical connector used for these kind of applications is disclosed in U.S. Pat. No. 5,574,814.

It is generally known from prior art that especially for the testing of electrical or optoelectronic devices, for example for quality control purposes, the cabling process is performed manually. Also, for maintenance of the electrical or the optoelectronic devices the manual performance of connection and disconnection is common, because automatic assembly machines are usually not available on site. Thereby, many lodge and dislodge steps have to be performed, which is very time-consuming and therefore costly. Furthermore, the accessibility of many connectors is usually restricted, which causes additional retardation during the cabling process. This is aggravated by the fact that workers performing assembly work usually wear gloves due to safety regulations, which reduces their dexterity.

Performing the manual removal of a connector, which is difficult to access, the connector is plugged-off by pulling it or even the cable or the optical fiber. Due to clamping between the connector and the connecting part a force has to be applied in order to pull-off the connector. Caused by this mechanical action, the connecting part has a tendency to distort. As a consequence, the alignment of the connector and the connecting part is disturbed, which might result in a damage of the involved components. This can be avoided only by holding down the connecting part with an appropriate tool, but this is very time-consuming and therefore costly. Furthermore, frequently performed connection and disconnection of connectors result in a reduction of fatigue strength of the involved components. As a consequence, fatigue failure of, for example, connectors, cables or circuit boards can occur.

Optical fibers tend to kink when being bent, due to their brittle material. Hence, during a cabling process optical fibers are exposed to distortion, especially when the accessibility of the connectors is limited. As a consequence, optical fibers damaged during the cabling process have to be replaced, which increases assembly time and cost.

SUMMARY OF THE INVENTION

According to the invention, there is provided a connector detacher for removing a connector, which is connected at a connecting portion to a connecting part of an electrical or an optoelectronic device, from said connecting part, wherein the connector detacher comprises a base body which has a recess for receiving the connector, the recess providing a connection passage open to the outside in a direction towards the connecting portion of the connector received within the recess, thereby allowing the connector to be connected at the connecting portion to the connecting part through the connection passage. Furthermore, the connector detacher has holding means for holding the connector within the recess and mechanical linkages arranged on the base body, said mechanical linkages having a sliding block pushing portion, which is moveable relative to the base body in a direction towards the connection passage and which is provided for pushing against the connecting part in order to strip the connector therefrom.

A connector detacher in accordance with the invention has the advantage that it can provide an efficient and economical procedure for connection and disconnection of a connector to a connecting part of an electrical or an optoelectronic device, wherein all components involved remain intact although the procedure is quick and convenient.

According to the invention the connector detacher comprises the base body with the recess for receiving the connector, the holding means holding the connector, and the mechanical linkages with the sliding block pushing portion.

Consequently, the connector detacher forms a single unit because all parts of the connector detacher are fixed together. Furthermore, the connector detacher can have a compact design, which allows that connector detachers to be mounted adjacent to each other. This is the reason why every individual connector of an electrical or an optoelectronic device can be equipped with the appropriate connector detacher. Also, during operation of an electrical or an optoelectronic device, the connectors can be equipped with connector detachers. Therefore, frequent connecting and disconnecting of the connectors are simplified by using the connector detachers. During an assembly process, for instance, this saves time and cost which would be necessary when replacing damaged connectors due to mishandling.

It is conceivable, that a testing device for testing the electrical or the optoelectronic device comprises testing connectors with which the testing is performed, whereby the testing connectors are connected to corresponding connecting parts of the electrical or the optoelectronic device. Before starting a cabling process in the context of connecting the testing device to the electrical or the optoelectronic device every connector can be equipped with a connector detacher. The cabling process, i.e. connecting and disconnecting of the connectors, can be performed by means of the connector detachers. The use of the connector detachers can reduce time and cost due to an efficient cabling process. Furthermore, in case of arrangement changes during testing, a quick action is possible. After finalizing the testing the connector detachers can be kept mounted on the test connectors of the testing device for further testing.

The base body comprises the mechanical linkages, which have a sliding block pushing portion moveable relative to the base body towards the connecting part, wherein the sliding block pushing portion is adjacent to the connecting part. During disconnection of the connector by pulling the base body away from the connecting part, the connecting part has a tendency to distort due to a clamping force between the connector and the connecting part. Thereby, by means of the sliding block pushing portion a countercheck is generated in order to prevent this distortion. As a consequence, the connecting part is held down by the sliding block pushing portion during disconnection of the connector. Therefore, a disconnection of the connector can be performed quickly and conveniently because no additional hold down with an appropriate tool is necessary.

The relative movement of the sliding block pushing portion is parallel to the detaching direction of the connector. Therefore, during detachment action no transverse forces occur at the connector or the connecting part. By virtue of a smooth detachment of the connector from the connecting part, only little force is necessary. Therefore, all components involved are treated with care so that damages caused by uncontrolled pulling can be avoided.

Usually, connectors have small dimensions so that their manual handling can be difficult. According to the invention, the base body comprises the recess for receiving the connector. Thereby, the base body can be used as a handle of the connector, wherein the connector is fixed inside the recess. This is the reason why the connector detacher improves the handleability of the connector. This is advantageous when connecting or disconnecting the connector by means of the connector detacher because the handling of the connector in combination with the connector detacher is facilitated compared to the handling of the connector alone.

The mechanical linkages drive the sliding block pushing portion towards the connecting part when unfolding. Due to the lever relationship rule, the force necessary to unfold the mechanical linkages can be smaller than the force transmitted to the sliding block pushing portion when dislodging the connector. For this reason, it is adequate to apply little force only for the disconnection of the connector.

Usually, mechanical linkages comprise a lever mechanism, wherein the levers have pivotally coupled legs so as to form a foldable respectively unfoldable framework. The mechanical linkages applied for the connector detacher can have several lever mechanisms with several legs. It is a preferred embodiment of the invention that the mechanical linkages comprise two sets of lever mechanism, each having two legs pivotally coupled to each other. One leg of each set is distally arranged with regard to the connection passage of the base body and is pivotally fixed thereon, the other leg of each set is proximally arranged with regard to the connection passage and is pivotally connected to the sliding block pushing portion. Unfolding of the mechanical linkages effects a movement of the sliding block pushing portion towards the connecting part, folding of the mechanical linkages effects a movement of the sliding block pushing portion backwards. Hence, the mechanical linkages form a drive unit for moving the sliding block pushing portion. They consist of a low number of components, whereby the connector detacher has a simple functionality and a space-saving design.

Preferably, the leg arrangement of the mechanical linkages at the base body is symmetrical to the moving direction of the sliding block pushing portion. Therefore, the level mechanism of the mechanical linkages can be pressed together perpendicular to the moving direction of the sliding block pushing portion in order to unfold the mechanical linkages and thereby drive the sliding block pushing portion toward the connecting part. This is the reason why no counter force i.e. transverse force must be generated in the base body or the connector or the connecting part during the dislodging of the connector. This is advantageous, because the transverse forces can damage the involved parts due to inappropriate strain.

The sliding block pushing portion can be embodied as a plunger or a piston, for example. However, it is a preferred embodiment of the invention that the sliding block pushing portion comprises two slide elements arranged opposite to each other with respect to the connector. The slide elements are driven by the mechanical linkages parallelly and simultaneously to each other so that the slide elements are pushed along the connector beyond its connecting portion. Therefore, the slide elements push symmetrically with respect to the connector against the connecting part and detach the connector precisely in detaching direction. This is the reason why, during the detaching of the connector, no tilting of the connector can occur, which would damage the connector and/or the connecting part.

Preferably, the slide elements are guided by guiding means when driven by the mechanical linkages. For example, a dovetail guide is conceivable, but a preferred embodiment are elongated slots in which each sliding element is guided as a sliding block. Hence, the sliding elements and the elongated slots form a slotted link. The elongated slots are formed in the base body at connector location and are open in the detaching direction. Therefore, the slide elements slide along the connector surface, wherein they are guided by the flanks of the elongated opening in the base body. Thereby, the slide elements are moveable adjacent to the connector to bring about a precise hold down of the connecting part by means of the slide elements.

In general, the shape of the base body is arbitrary. A block-shaped elongated base body, however, is preferred, appropriate to be used as the handle of the connector. Since the accessibility of the connected connectors is usually reduced, the disconnection of the connector by means of the connector detacher using the handle-like base body is convenient and therefore time-saving.

The base body has the recess for receiving the connector, the recess providing a connection passage open to the outside in a direction towards the connecting portion of the connector. A possible embodiment would be that the base body comprises one piece and the connector has a glue joint inside the recess. It is also conceivable that the base body and the connector are formed integrally into one piece. It is a preferred embodiment that the base body comprises a casing having two halves, which have the recess therebetween. Between the two halves inside the recess the connector can be clamped by the holding means holding together the two halves. Thereby, a quick mounting or dismounting of the connector can be performed because the connector can be put into or taken out of the recess when the two halves are separated. This means a simplified installation of the connector since usually the connector is already connected to the cable or the optical fiber when the installation process has to be performed.

For holding the two casing halves together, separate clamping means can be applied. It is a preferred embodiment that the legs of the mechanical linkages are used for clamping the casing halves. The two legs distally arranged with regard to the connection passage encompass the two casing halves semicircular, thereby clamping the two halves together. This simple design of the connector detacher simplifies handling and therefore reduces assembly time.

For holding the connector inside the recess, the holding means preferably comprises one or more removeable clamp-type retainers which can engage corresponding holes in the casing halves, thereby clamping these two halves together. Since the mounted retainers can safely transfer clamping forces to the connector, they can clamp the connector inside the recess although the retainers can be removed quickly by tweezers. In order to facilitate the removing of the retainers, it is a preferred embodiment that the base body comprises one or more cavities adjacent to the installed retainers. These cavities allow tweezers a better accessibility to the retainer.

The mechanical linkages comprise pivotal connections for pivoting the lever mechanism in order to fold respectively unfold the mechanical linkages. This is the reason why the pivotal connections have to be constructed as articulations wherein pin connections are preferred. They can easily be produced and can be designed as removeable connections. The removability of the pin connections is an advantage when used for pin connections between the slide elements and the corresponding legs of the mechanical linkages. In case if the slide elements are worn or damaged by tearing the slide elements can easily be replaced by removing the corresponding removeable pin connection.

The connector received within the recess has an attached cable or optical fiber to be guided from the connector to the outside. For this purpose, it is a preferred embodiment that the base body comprises a cable passage connected to the recess and arranged opposite to the connection passage with regard to the recess. Furthermore, the cable passage has peripheral walls rounded towards the outside, thereby allowing the cable or the optical fiber to be smoothly guided by the base body. This prevents kinking of the cable or the optical fiber at base body edge which would cause expensive and time-consuming repair and replacement actions.

BRIEF DESCRIPTION OF THE DRAWINGS

In the following the invention is explained with reference to embodiments represented in the drawings, wherein.

DETAILED DESCRIPTION OF A PREFERRED EMBODIMENT OF THE INVENTION

Figure 1:
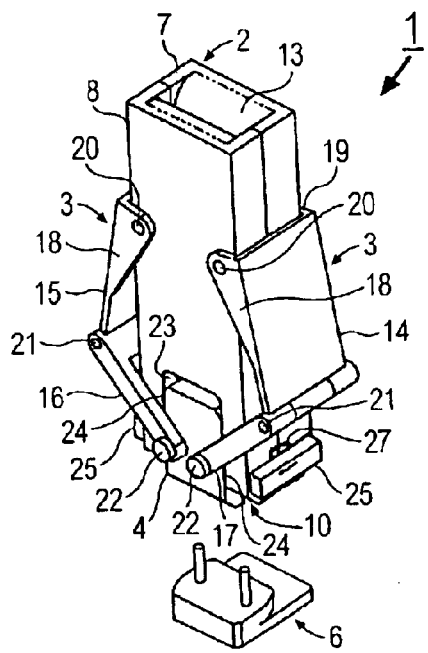
FIG. 1 shows an isometric view of the connector detacher according to an embodiment including a connector arranged such as the connector is disconnected from a connecting part.
Figure 2:
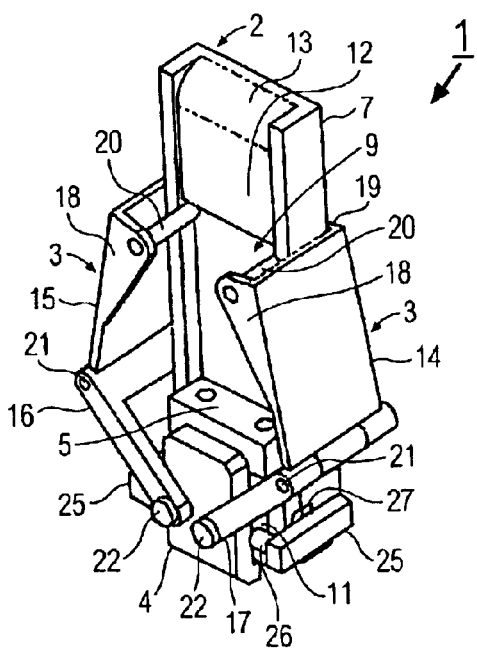
FIG. 2 shows a cut-open isometric view of the connector detacher according to the first embodiment.

FIGS. 1 and 2 show a possible embodiment of the invention. A connector detacher 1 comprises a base body 2, mechanical linkages 3 with a slide 4. Inside the base body 2 a connector 5 is attached, which can be connected or disconnected to a connecting part 6. Thereby, the connection or disconnection has to be performed against or in detaching direction, which is vertically according the orientation of the connector detacher 1 shown in FIGS. 1 and 2.

The base body 2 is of block-type and comprises a casing with two casing halves 7 and 8 having a parting plane, which is parallel to the detaching direction. The two casing halves 7 and 8 are formed into a shell so that between the two halves 7 and 8 a recess 9 is defined. The recess 9 has a block-type form similar to the form of the base body 2 and is defined by parallel side wall pairs formed by the casing halves 7 and 8. Furthermore, the recess 9 has a connection passage 10 open to the outside in a direction towards the connecting part 6 The shape of the recess 9 is adapted to the shape of the connector 5 such as the connector can be pushed in the recess 9 through the connection passage 10.

The connector 5 shown in FIGS. 1 and 2 is of block-type and comprises a connection portion 11, at which a connection to the connecting part 6 can be performed, and a portion opposed to the connecting portion 11 where a cable or an optical fiber is attached (not shown). The connector 5 is embedded inside the recess 9 such as to allow the connecting portion 11 of the connector 5 to be connected to the connecting part 6 through the connection passage 10. Furthermore, the connector 5 is fixed inside the recess 9 in order to form a unity with the base body 2 and therefore with the connector detacher 1. For this reason, the connector 5 cannot be dislodged from the base body 2 by mistake. Hence, the base body 2 can be used as handle when handling the connector. Preferably, the base body 2 is formed as an elongated body which can improve its handiness during connecting and disconnecting action of the connector.

The base body 2 comprises a cable passage 12 which is connected to the recess 9 and is located opposite to the connection passage 10 of the connector 5 with regard to the recess 9. Inside the cable passage 12 the cable or the optical fiber attached to the connector 5 is guided towards the outside. The cable passage 12 includes an opening through which the cable or the optical fiber is directed towards the outside. The cable passage 12 includes an opening through which the cable or the optical fiber is directed towards the outside. The opening is located opposite to the connection passage 10 of the recess 9, so that the connector 5 and the cable or the optical fiber guided within the cable passage 12 to the aligned in, order to create a stress-free arrangement. The opening of the cable passage 12 to the outside has peripheral walls 13 rounded towards the outside in order to allow smooth guidance and therefore generate only a harmless bending of the cable or the optical fiber. It is preferred that the cross section area of the cable passage 12 is narrow such as to clamp the passing cable or the passing optical fiber. This is advantageous, because any longitudinal forces transferred by the cable or the optical fiber to the connector 5 are reduced by a clamping effect.

The mechanical linkages 3 comprise a lever mechanism, whereby the levers have pivotally coupled legs 14, 15, 16 and 17 such as to form a foldable respectively unfoldable framework. The mechanical linkages 3 comprise two sets of lever mechanism, each having two legs 14, 17 and 15, 16 pivotally coupled to each other. One leg 14, 15 of each set is distally arranged with regard to the connection passage 10 of the base body 2 and is pivotally fixed thereon, the other leg 17, 16 of each set is proximally arranged with regard to the connection passage 10 and is pivotally connected to the slide. The pair of legs 14, 15 distally arranged form the connection passage 10 comprise an U-shape with two lateral limbs 18, 19, whereby the legs 14, 15 encompass the two casing halves 7, 8 semicircular with the limbs 18, 19, thereby clamping these two halves 7, 8 together. Both limbs 18, 19 of each said leg 14, 15 comprise a pivotal coupling with the respective casing halve 7, 8 so that each of said leg 14, 15 is pivotally coupled with respect to the base body 2.

The pivotal couplings of the legs 14, 15, 16, 17 comprise pin the connections 20, 21, 22 so that the required pivotal movement of all involved members can be performed. All pins of the pin connections 20, 21, 22 are arranged parallel to each other so that the pivotal movements of all relevant members proceed in one common plane. This is necessary for the functionality of the lever mechanism of the mechanical linkages 3.

According to the embodiment, the pin connections 20 at the two corresponding limbs 18 and 19 are arranged in this way that an individual pin is guided through opposing holes in the limbs 18, 19 and the two casing halves 7, 8 such as the legs 14 and 15 can perform a rocking movement. The other legs 17 and 16 of the lever mechanisms are pivotally connected to the slide 4 and are connected to the legs 14 and 15, respectively, by a hinge-like pin connection. Therefore, the legs 14, 15 and 17, 16, respectively, of each lever mechanism are pivotally moveable against each other.

The recess 9 comprises two oblong openings 23 located opposite to each other and in the vicinity of the connection passage 10, whereby the connector 5 is located intermediary the two openings 23. Each opening 23 comprises an embedded block-shaped slide 4 which is guided by means of two parallel flanks 24 of the openings 23 to bring about a moveable bearing of each slide.

The pair of legs 17, 16 proximally arranged with regard to the connection passage 10 is pivotally connected to the slide 4 by the pin connections 22. This results in a functionality comparable to a slotted link with a rocking arm. Preferably, the pin connections 22 are constructed to be removeable so that the slide 4 can be replaced in case of its wear and tear.

The two sets of lever mechanism comprising the legs 14, 17 and 15, 16 are arranged at the base body 2 opposite to each other. In case the legs 14, 17 and 15, 16 are pivoted towards the casing, the slide 4 is moving in detaching direction towards the connecting part 6. Contrary to this, when the legs 14, 17 and 15, 16 are pivoted away from the base body 2, the slide 4 is moving in detaching direction away from the connecting part 6. Hence, pivoting the legs 14, 17 and 15, 16 of the mechanical linkages 3 toward to the base body 2 and away from the base body 2 generate a forward and backward movement of the slide 4 parallel to the detaching direction. That means, that in case the connector 5, which is embedded inside the recess 9, is connected to the connecting part 6, the connector 5 can be detached from the connecting part 6 by means of the slide 4 pushing towards the connecting part 6.

Each casing halve 7, 8 comprises two holes arranged opposite to each other, wherein the holes comprise a parallel axis. Each hole of the casing halve 7 corresponds to a hole of the casing halve 8 and forms a hole pair, whereby the holes of each pair have a common orientation. Two retainers 25 comprise respectively two locking pins 26, whereby the retainers 25 are arranged so that the locking pin 26 engage the two corresponding holes of a hole pair. Thereby, the retainers 25 clamp the two casing halves 7, 8 together. The holes and thus the retainers 25 are arranged adjacent to the connector 5 which is embedded inside the recess 9. This is the reason why the retainers 25 are used firstly for holding together the casing halves 7, 8 proximally to the connection passage 10 and secondly for clamping the connector 5 inside the recess 9.

Adjacent to the retainers 25 the casing halves 7, 8 comprise cavities 27. These cavities 27 deepen the surface of the base body 2 so as to increase the accessibility for grasping the retainers 25 during mounting or dismounting the connector 5 within the recess 9.

For preparation of an assembly process of an electrical or an optoelectronic device, for example, the relevant connectors have to be mounted in the connector detachers. Regarding one connector detacher 1 according to FIGS. 1 and 2, the retainers 25 have to be dislodged in order to release the clamping of the two casing halves 7, 8 at the connection passage 10. After that, the connector 5 can be set into the recess 9 by pushing it through the connection passage 10 into the recess 9. When the connector 5 has reached its appropriate position, i.e. when the connecting portion 11 is arranged such as to be connected to the connecting part 6, the retainers 25 have to be lodged again for clamping the two casing halves 7, 8 together and therefore fixing the connector 5 inside the recess 9. For dismounting the connector 5 the steps have to be repeated vice versa.

Although the present invention and its advantages have been described in detail, it should be understood that various changes, substitutions and alterations can be made herein without departing from the spirit and scope of the invention as defined by the appended claims.

What is claimed is:

1. A connector detacher for removing a connector, which is connected at a connecting portion to a connecting part of an electrical or an optoelectronic device, from said connecting part, comprising:
   a base body which has a recess for receiving the connector, the recess providing a connection passage open to the outside in a direction towards the connecting portion of the connector received within the recess, thereby allowing the connector to be connected at the connecting portion to the connecting part through the connection passage;
   holding means for holding the connector within the recess;
   mechanical linkages arranged on the base body, said mechanical linkages having a sliding block pushing portion which is moveable relative to the base body in direction towards the connection passage and which is provided for pushing against the connecting part in order to strip the connector therefrom.

2. The connector detacher according to claim 1, wherein the mechanical linkages comprise two sets of separate lever mechanism, each having two legs pivotally coupled to each other, wherein one leg of each set is distally arranged with regard to the connection passage and is pivotally fixed to the base body and the other leg of each set is proximally arranged with regard to the connection passage and is pivotally connected to the sliding block pushing portion, thereby forming a drive unit for moving the sliding block pushing portion towards the connection passage and back.

3. The connector detacher according to claim 1, wherein the sliding block pushing portion comprises a slide which is guided in an elongated slot provided in the base body.

4. The connector detacher according to claim 1, wherein the base body is formed by a casing having two halves having the recess therebetween and between which the connector can be clamped by holding means the holding together the two halves.

5. The connector detacher according to claim 2, wherein the base body is formed by a casing having two halves having the recess therebetween and between which the connector can be clamped by holding means the holding together the two halves.

6. The connector detacher according to claim 4, wherein the holding means comprises one or more clamp-type retainers which can engage corresponding holes in the casing, thereby clamping these two halves together.

7. The connector detacher according to claim 1, wherein the base body is formed by a casing having two halves having the recess therebetween and between which the connector can be clamped by holding means the holding together the two halves, and wherein the two legs distally arranged with regard to the connection passage encompass the two casing halves semicircular, thereby clamping these two halves together.

8. The connector detacher according to claim 2, wherein the base body is formed by a casing having two halves having the recess therebetween and between which the connector can be clamped by holding means the holding together the two halves, and wherein the two legs distally arranged with regard to the connection passage encompass the two casing halves semicircular, thereby clamping these two halves together.

9. The connector detacher according to claim 1, wherein the base body comprises a cable passage connected to the recess and arranged opposite to the connection passage with regard to the recess, the cable passage having peripheral walls rounded towards the outside, thereby allowing a cable or an optical fiber attached to the connector received within the recess to be smoothly guided by the base body.

10. The connector detacher according to claim 4, wherein the base body comprises one or more cavities adjacent to the installed retainers for facilitating removal of the retainers.

11. A testing device for testing an electrical or an optoelectronic device, the testing device comprising a connector detacher according claim 1 and a connector received within the recess.

* * * * *